US011025137B2

(12) United States Patent
Aronovich et al.

(10) Patent No.: US 11,025,137 B2
(45) Date of Patent: Jun. 1, 2021

(54) ELECTRIC MACHINE WITH STATOR COOLING CHANNELS

(71) Applicant: MTS Systems Corporation, Eden Prairie, MN (US)

(72) Inventors: Victor Leonid Aronovich, Plymouth, MN (US); John Wesley Wattleworth, Saint Peter, MN (US); Gregory Alan Larson, Prior Lake, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 674 days.

(21) Appl. No.: 15/704,771

(22) Filed: Sep. 14, 2017

(65) Prior Publication Data

US 2018/0076694 A1    Mar. 15, 2018

Related U.S. Application Data

(60) Provisional application No. 62/394,593, filed on Sep. 14, 2016.

(51) Int. Cl.
*H02K 9/197* (2006.01)
*H02K 15/12* (2006.01)

(52) U.S. Cl.
CPC ............ *H02K 9/197* (2013.01); *H02K 15/12* (2013.01)

(58) Field of Classification Search
CPC ............ H02K 1/16; H02K 1/165; H02K 1/20; H02K 9/19; H02K 9/193; H02K 9/197; H02K 3/34; H02K 3/345

(Continued)

(56) References Cited

U.S. PATENT DOCUMENTS 2,706,260 A    4/1955  Heintz
2,902,611 A    9/1959  Rosenberg
(Continued)

FOREIGN PATENT DOCUMENTS

DE    102004013721 A1    10/2005
DE    102006029803 A1    1/2008
WO       2010099974 A2    9/2010

OTHER PUBLICATIONS

International Search Report dated Jan. 23, 2018 for corresponding International Application No. PCT/US2017/051612, filed Sep. 14, 2017.

*Primary Examiner* — Nguyen Tran
(74) *Attorney, Agent, or Firm* — Steven M. Koehler; Westman, Champlin & Koehler, P.A.

(57) ABSTRACT

An electric machine includes a housing, a rotor rotatably supported by the housing for rotation about a longitudinal axis and a stator assembly fixed secured to the housing spaced apart from a surface of the rotor and concentric with the rotor about the longitudinal axis. The stator assembly includes a stator winding comprising circumferentially spaced apart stator teeth about the longitudinal axis, the stator teeth having remote ends proximate the surface of the rotor. A plurality of sealed cooling channels extend parallel to the longitudinal axis and are disposed between remote ends of successive teeth. The cooling channels are formed in resin of the stator assembly, the cooling channels being fluidly connected to ports in a closed system to circulate cooling fluid to cool the stator assembly and configured to remove heat from the stator assembly proximate the rotor surface. Other aspects include methods of making such machines.

23 Claims, 13 Drawing Sheets

(58) Field of Classification Search
USPC .................................. 310/43, 54, 58, 59
See application file for complete search history.

(56) References Cited

U.S. PATENT DOCUMENTS

| | | | |
|---|---|---|---|
| 3,254,246 A | 5/1966 | Philofsky | |
| 3,597,645 A | 8/1971 | Duffert | |
| 4,013,908 A | 3/1977 | Weghaupt | |
| 4,061,937 A | 12/1977 | Goel | |
| 4,208,597 A | 6/1980 | Mulach | |
| 4,278,906 A | 7/1981 | Kullmann | |
| 4,279,944 A | 7/1981 | Laskaris | |
| 4,341,966 A | 7/1982 | Pangburn | |
| 6,333,573 B1 | 12/2001 | Nakamura | |
| 6,368,530 B1 | 4/2002 | Adubato | |
| 6,777,836 B2 | 8/2004 | Tong | |
| 6,903,471 B2 | 6/2005 | Arimitsu | |
| 6,954,010 B2 | 10/2005 | Rippel | |
| 6,972,505 B1 | 12/2005 | Leijon | |
| 7,019,429 B1 | 3/2006 | Larsson | |
| 7,023,312 B1 | 4/2006 | Lanoue | |
| 7,647,692 B2 | 1/2010 | Lanoue | |
| 7,705,495 B2 | 4/2010 | Alfermann | |
| 8,164,225 B2 | 4/2012 | Maduskuie | |
| 8,350,434 B2 | 1/2013 | Hori | |
| 8,541,923 B2 | 9/2013 | Leiber et al. | |
| 2005/0052091 A1* | 3/2005 | Arimitsu | B60L 15/20 310/266 |
| 2007/0035187 A1* | 2/2007 | Verhaegen | H02K 3/24 310/59 |
| 2009/0079278 A1 | 3/2009 | Kramer | |
| 2012/0007453 A1 | 1/2012 | Leiber et al. | |
| 2012/0133221 A1 | 5/2012 | Leiber et al. | |
| 2015/0381015 A1 | 12/2015 | Hattori | |

\* cited by examiner

ELECTRIC MACHINE WITH STATOR COOLING CHANNELS

CROSS-REFERENCE TO RELATED APPLICATION

This application claims the benefit of U.S. Provisional patent application Ser. No. 62/394,593, entitled "ELECTRIC MACHINE WITH STATOR COOLING CHANNELS" filed Sep. 14, 2016, the contents of which is incorporated herein by reference in its entirety.

BACKGROUND OF THE INVENTION

The discussion below is merely provided for general back-ground information and is not intended to be used as an aid in determining the scope of the claimed subject matter.

Electric machines such as machines and generators include a stator winding typically secured within or to a housing and a rotor mounted on a shaft coaxially with respect to the stator winding. The rotor is rotatable relative to the stator winding about the longitudinal axis of the shaft. Current is controlled through the stator winding to create a rotating magnetic field which rotates the rotor and the shaft. The current through the stator winding also generates heat. It is generally known that fluid can be directed through channels provided in the stator winding to remove heat; however, improvements are still needed in such machines and methods of making such machines.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

One general aspect includes an electric machine having a housing and a rotor rotatably supported by the housing for rotation about a longitudinal axis. The electric machine also includes a stator assembly fixed secured to the housing spaced apart from a surface of the rotor and concentric with the rotor about the longitudinal axis. The stator assembly has a stator winding including circumferentially spaced apart stator teeth about the longitudinal axis. The stator teeth have remote ends proximate the surface of the rotor. A plurality of longitudinal sealed cooling channels extend parallel to the longitudinal axis and are disposed between remote ends of successive teeth, the cooling channels being formed in resin of the stator assembly. The cooling channels are fluidly connected to ports in a closed system to circulate cooling fluid to cool the stator assembly and configured to remove heat from the stator assembly proximate the surface of the rotor.

Implementations may include one or more of the following features. The electric machine where each end of each longitudinal cooling channel is fluidly connected to radially extending channels formed in the stator assembly. The radially extending channels are disposed at each end of the stator assembly. The longitudinal cooling channels and ends of the radially extending channels can open to an annular space about the longitudinal axis at each end of the stator assembly. If desired, at least a portion of each of the radially extending channels are formed in resin of the stator assembly. At least some of the radially extending channels can be bounded in part by conductors of end turns of the stator assembly. An inner sleeve can be concentrically disposed about the longitudinal axis radially inward from remote ends of the stator teeth. The annular space can be defined in part by an annular sealing device. In one embodiment, the sealing device includes a ring and a first o-ring sealing engaging the ring and a portion of the housing and a second o-ring sealing engaging the ring and a portion of the inner sleeve. Portions of an inner surface of the inner sleeve can define a portion of each longitudinal cooling channel.

If desired, additional cooling channels are open to the inner surface of the housing along each longitudinal length. In one embodiment, the stator teeth comprise laminations, each lamination having a plurality of notches, where each notch is aligned with a notch of an adjacent lamination to form each corresponding cooling channels. The cooling channels can open to a common annular passageway on each end of the stator assembly. Each common annular passageway is fluidly coupled to a port, where a first port receives fluid into its associated common annular passageway and a second port receives fluid from its associated common annular passageway.

One general aspect includes an electric machine having a housing and a rotor rotatably supported by the housing for rotation about a longitudinal axis. The electric machine also includes a stator assembly fixed secured to the housing spaced apart from a surface of the rotor and concentric with the rotor about the longitudinal axis. The stator assembly has a stator winding including circumferentially spaced apart stator teeth about the longitudinal axis. The stator teeth have remote ends proximate the surface of the rotor. Radially extending channels are disposed at each end of the stator assembly, where at least a portion of each of the radially extending channels are formed in resin of the stator assembly and where at least some of the radial extending channels are bounded in part by conductors of end turns of the stator assembly. This electric machine can include one or more of the afore-mentioned features.

One general aspect includes an electric machine having a housing and a rotor rotatably supported by the housing for rotation about a longitudinal axis. The electric machine also includes a stator assembly fixed secured to the housing spaced apart from a surface of the rotor and concentric with the rotor about the longitudinal axis. The stator assembly has a stator winding including circumferentially spaced apart stator teeth about the longitudinal axis. The stator teeth have remote ends proximate the surface of the rotor. Each tooth has a centerplane across a width extending radially, where a plurality of cooling channels extend parallel to the longitudinal axis are arranged on an outer periphery of the stator assembly such that a cooling channel is located on each centerplane. Each cooling channel is sealed by an inner surface of the housing along a longitudinal length thereof. This electric machine can also include one or more of the afore-mentioned features.

One general aspect includes an electric machine having a housing and a rotor rotatably supported by the housing for rotation about a longitudinal axis. The electric machine also includes a stator assembly fixed secured to the housing spaced apart from a surface of the rotor and concentric with the rotor about the longitudinal axis. The stator assembly has a stator winding including circumferentially spaced apart stator teeth about the longitudinal axis. The stator teeth have remote ends proximate the surface of the rotor. Each tooth has a portion of lowest flux density during operation at an outer periphery opposite an inner surface of the housing, and where a plurality of cooling channels extend parallel to the longitudinal axis are arranged on the outer periphery of the stator assembly such that a cooling channel is located at each of the portions of lowest flux density for each of the stator teeth. This electric machine can also include one or more of the afore-mentioned features.

One general aspect includes a method of forming rotor cooling channels in a stator assembly of an electric machine. The method includes arranging a plurality of longitudinally extending elements adjacent an outer surface of a cylindrical sleeve and between each of two successive teeth of a plurality of radially extending teeth; impregnating the stator assembly with resin disposed between each of two successive teeth of the plurality of teeth and against each of the longitudinally extending elements and portions of the outer surface of the cylindrical sleeve on each side of the longitudinally extending channels; and removing each of the longitudinally extending elements so as to leave a plurality of rotor cooling channels, each rotor cooling channel completely sealed along a longitudinal length thereof. The method can include one or more of the afore-mentioned features.

One general aspect includes a method of forming rotor cooling channels in a stator assembly of an electric machine. The method includes arranging a plurality of radially extending elements at each end of the stator assembly, each of the radially extending elements extending through a set of conductor loops forming end turns of a stationary winding; impregnating the end turns of the stator assembly with resin so as to encase each of the radially extending elements along associated longitudinal lengths thereof; and removing each of the radially extending elements so as to leave a plurality of radial passageways on each end of the stator assembly. This method can also include one or more of the afore-mentioned features.

DESCRIPTION OF THE ILLUSTRATIVE EMBODIMENT

Figure 1:
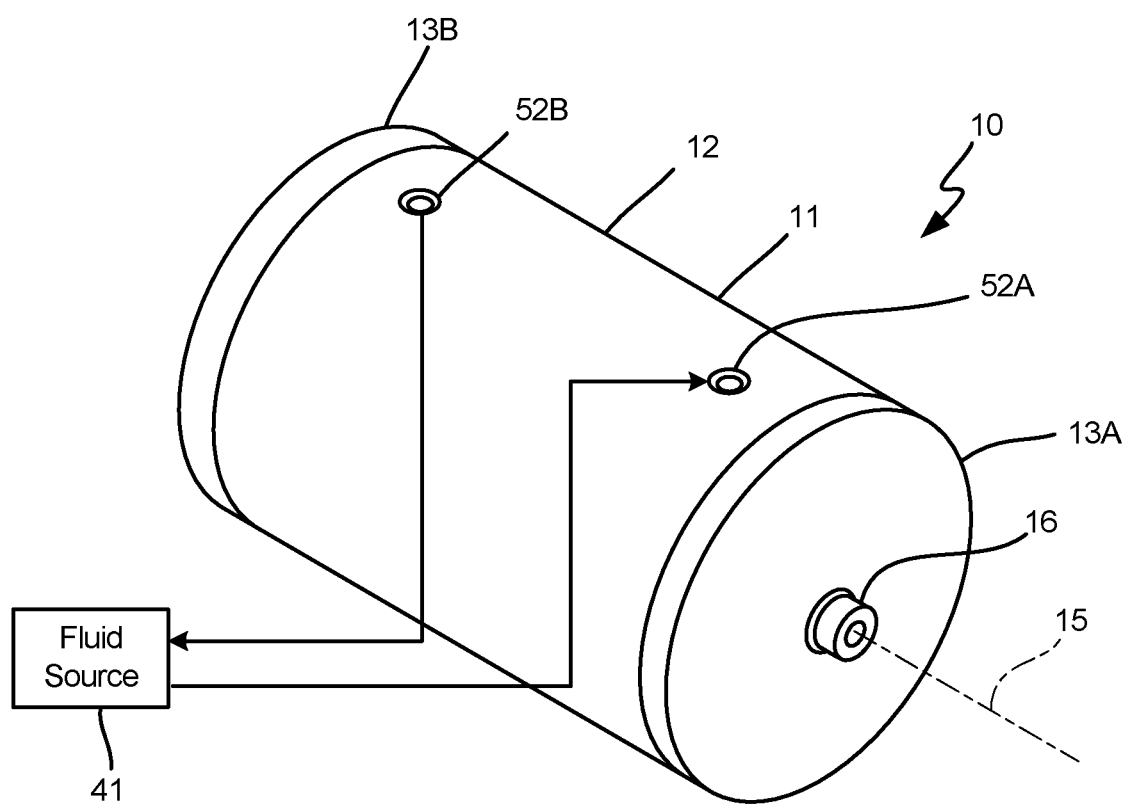
FIG. 1 is a perspective view of an exemplary electric machine.
Figure 1A:
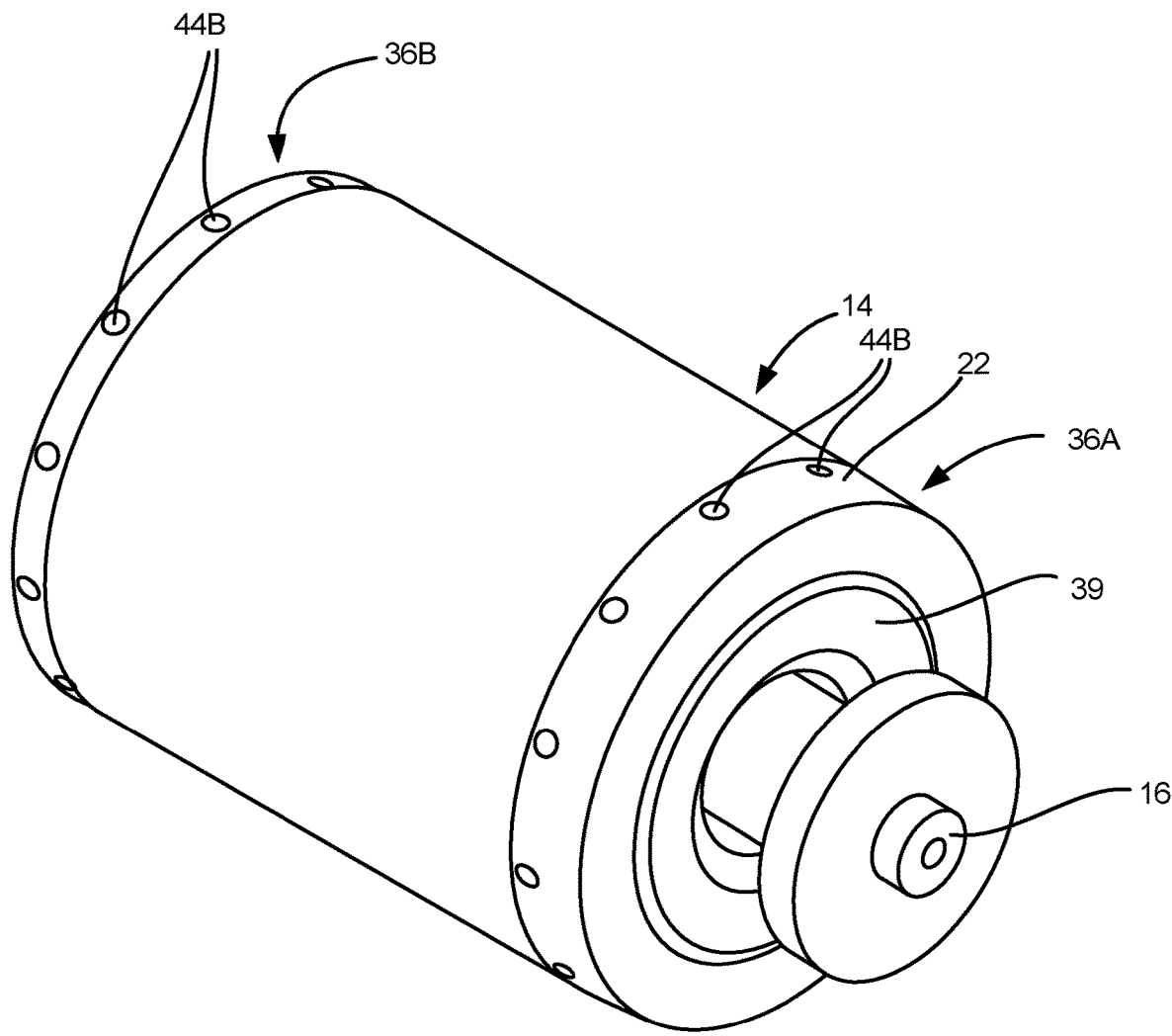
FIG. 1A is a perspective view of the electric machine with portions removed.

Referring to the drawings wherein like reference numbers represent the same or similar components throughout the several figures, there is shown in FIG. 1A schematic representation of an electric machine 10 such as a motor or a generator. The electric machine 10 is shown for illustrative purposes in accordance with an illustrative embodiment; however it should be appreciated aspects of the present invention can be used with many electric motor or generator configurations.

Figure 1B:
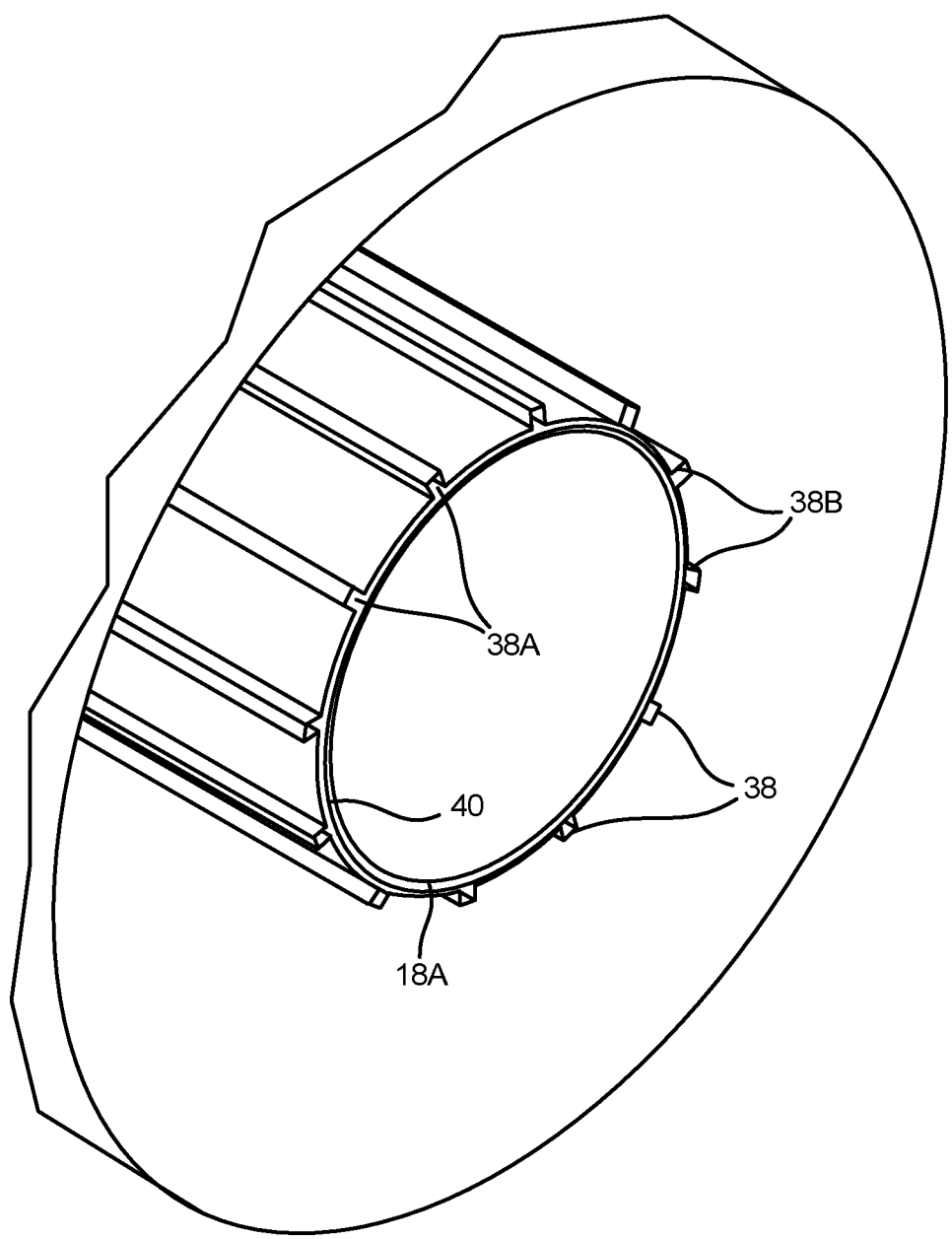
FIG. 1B is a schematic illustration of longitudinal cooling channels.
Figure 1C:
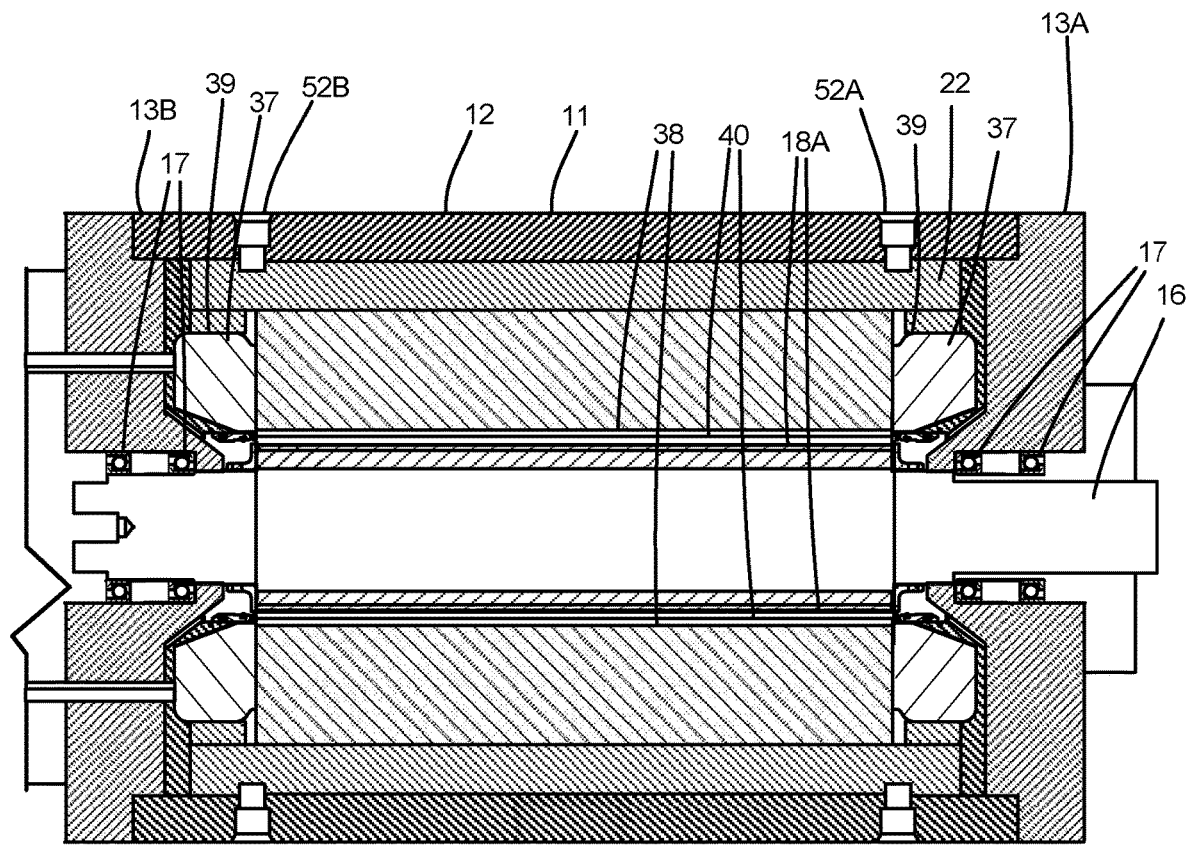
FIG. 1C is a first sectional view of the electric machine.
Figure 2:
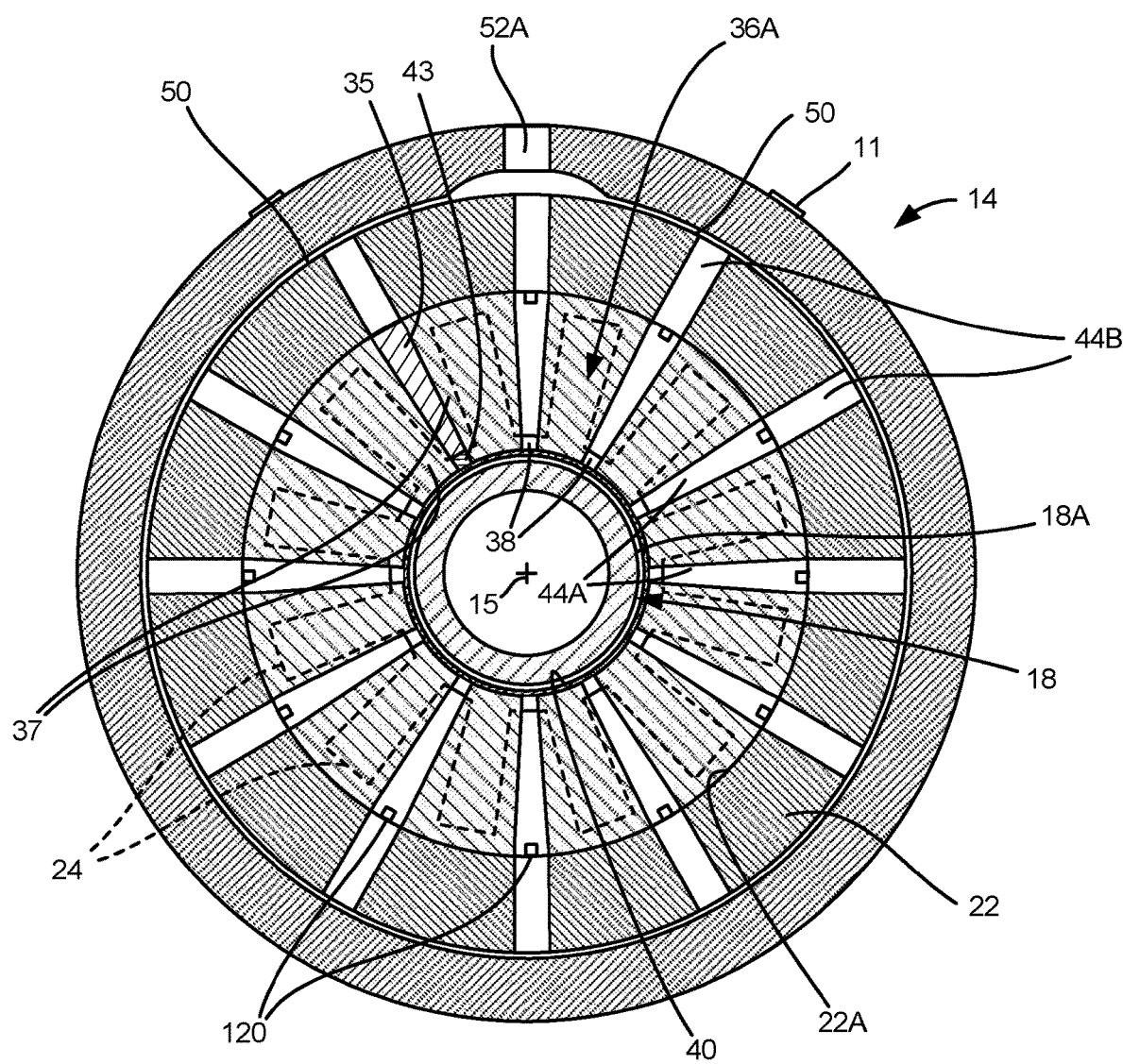
FIG. 2 is a third sectional view of the electric machine.
Figure 3:
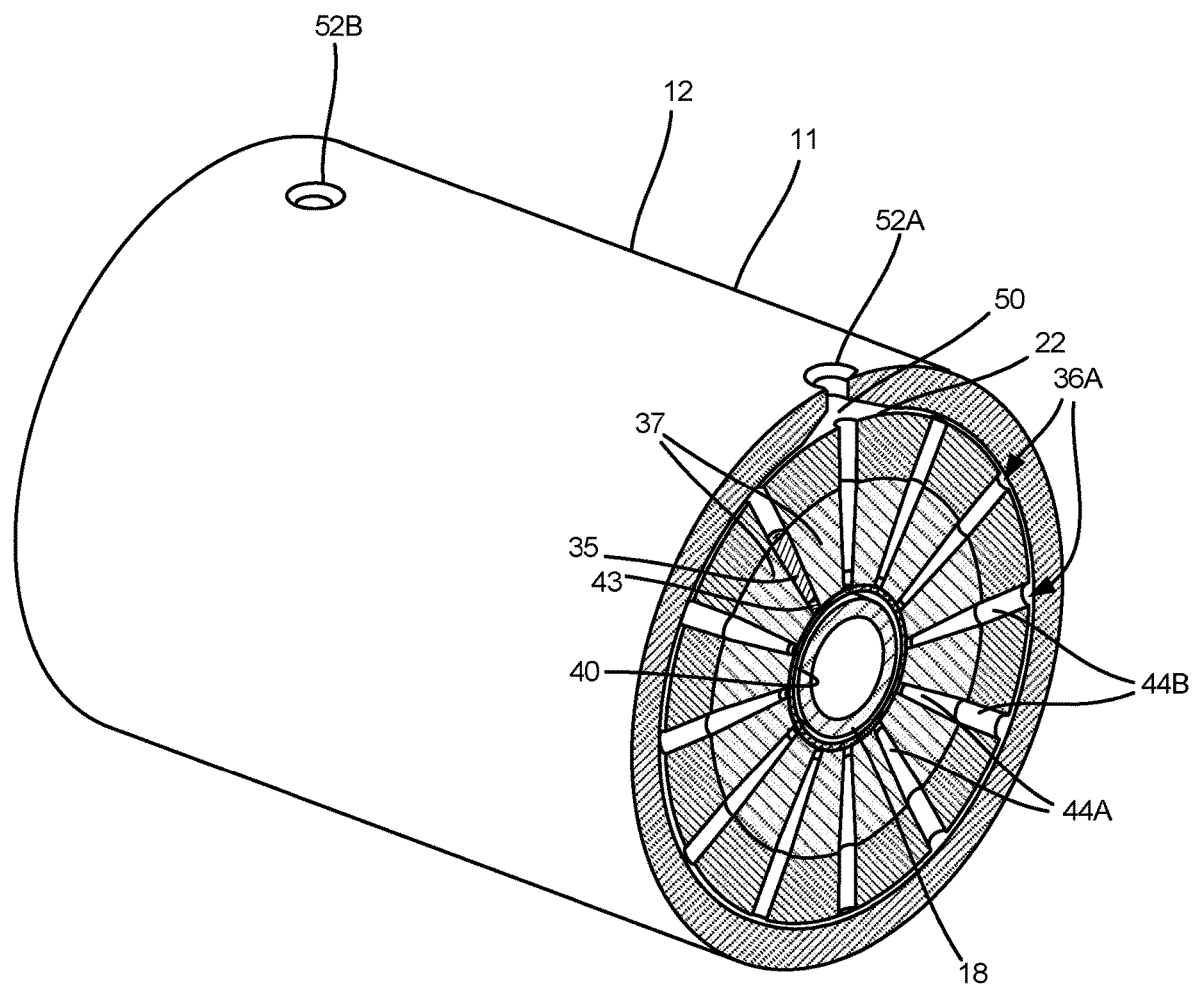
FIG. 3 is a fourth sectional view of the electric machine.

The electric machine 10 includes a housing 12, a stator assembly 14, a shaft 16, and a rotor 18 (FIG. 2). The housing 12 includes a tubular center section 11 with end plates 13A and 13B. The stator assembly 14 is substantially annular and is secured within or to the housing 12 to remain stationary relative to the housing 12 during operation of the machine 10. The rotor 18 is fixed to the shaft 16 for unitary rotation therewith about a longitudinal axis 15 and is generally circumscribed by the stator assembly 14. The rotor 18 and shaft 16 are rotatable relative to the housing 12 and the stator assembly 14 being supported by one or more bearing assemblies 17 on end plates 13A and 13B (FIG. 1C).

Figure 4:
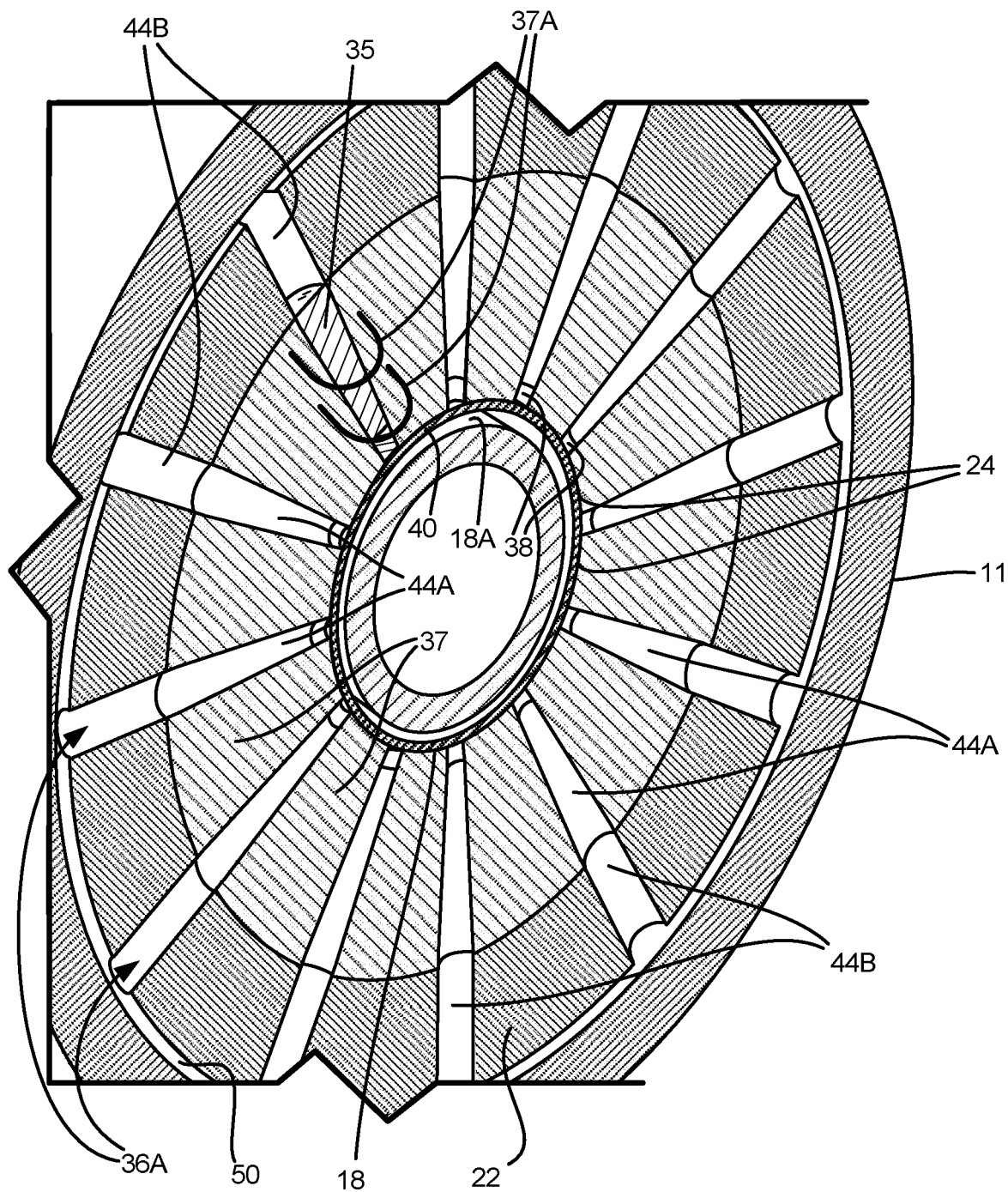
FIG. 4 is an enlarged portion of FIG. 3.
Figure 5:
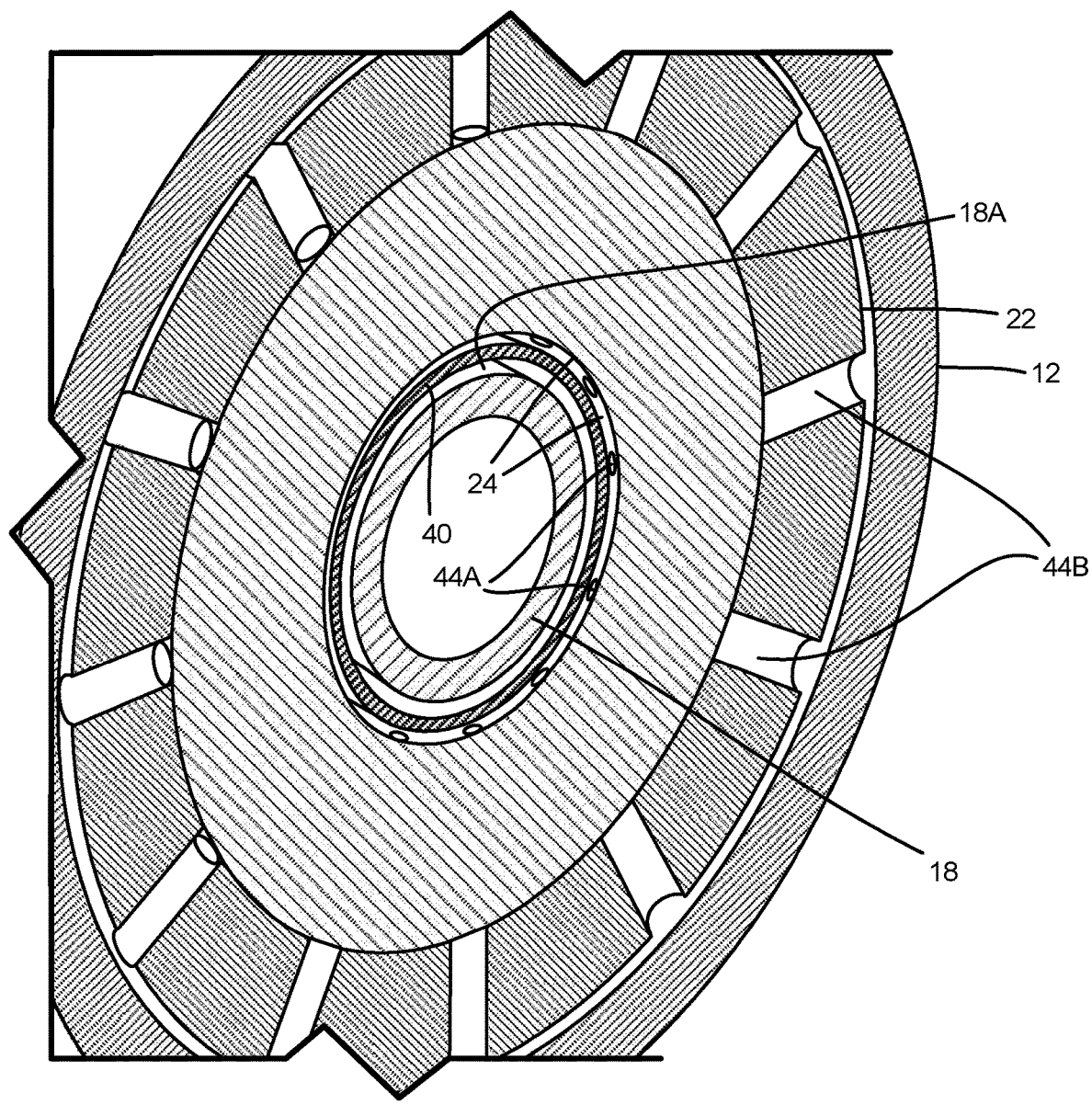
FIG. 5 is a fifth sectional view of the electric machine.

Referring to FIG. 2, the stator assembly 14 includes a stator sleeve or shell 22, and a plurality of stator teeth 24 extending in a radially inward direction toward the axis 15. One or more conductors (schematically represented by areas or slots between each of the stator teeth 24 and conductors 37A in FIG. 4) are wound or wrapped around each of the stator teeth 24 and collectively form a stator coil or winding. For purposes of the present invention, the phrase "a stator winding" may take a number of different forms, and thus should not be considered limiting, including a single conductor wound around each of a plurality of stator teeth 24, and/or a plurality of conductors 37A which are each wound around one or more stator teeth 24 and then connected together. The particular number and manner in which the conductors are provided in the stator assembly 14 does not form part of the present invention.

The stator assembly 14 is impregnated with epoxy resin such that the conductor(s) of the stator winding are electrically isolated from each other and mechanically fixed within the stator assembly 14. The stator teeth 24 can be composed of steel laminations and the conductors can be composed of suitable electrical conductor such as copper. It should be appreciated; however, that alternate epoxy resin, stator core and/or stator wire compositions may be envisioned.

Figure 1D:
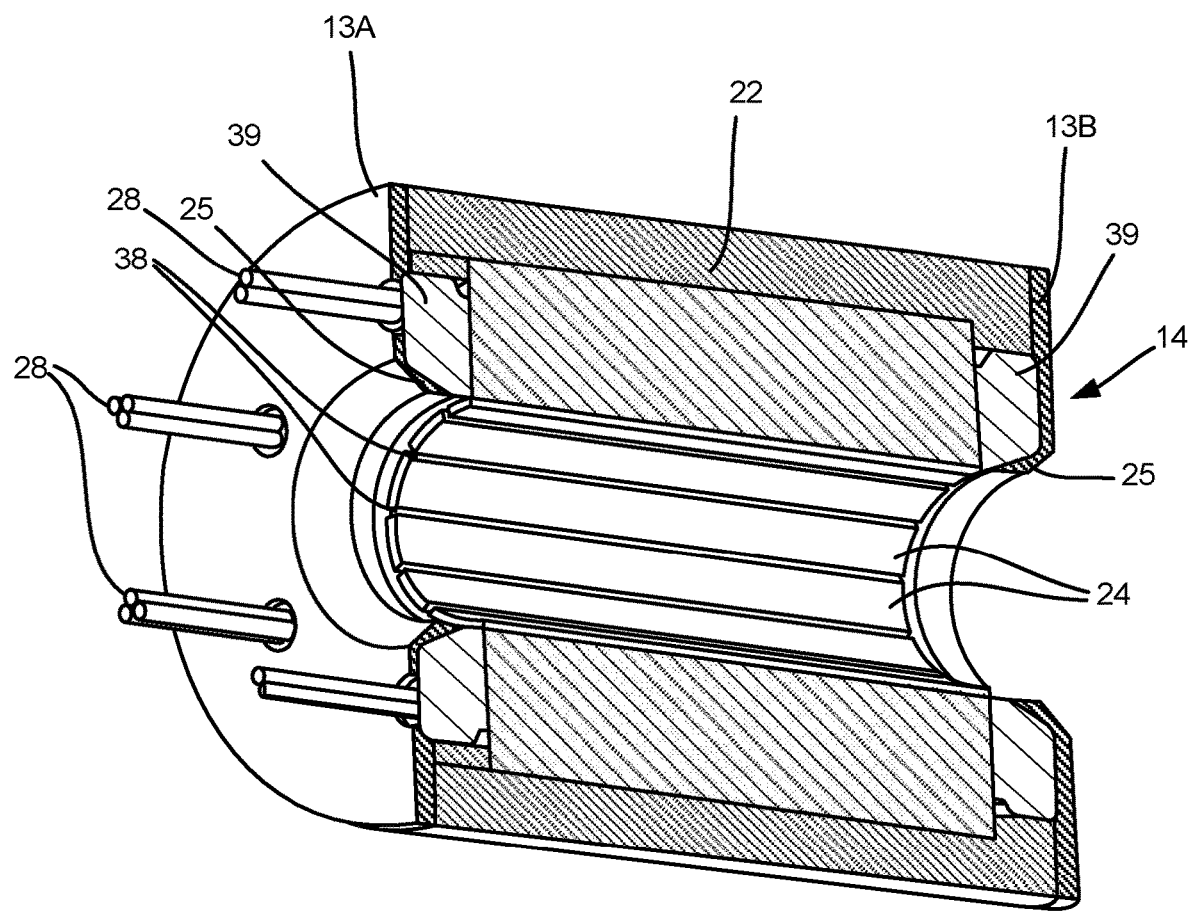
FIG. 1D is a second sectional view in perspective of the electric machine.

Terminal ends of some of the conductors for the stator windings are illustrated at 28 in FIG. 1D. The end turns 37 (formed of individual conductors 37A in FIG. 4) where the conductors extend out of one of the slots between the stator teeth 24, wrap around each end stator tooth 24 and extend into a slot on a side of each tooth 24 opposite the slot from which the conductors extended out of. When impregnated with resin, the end turns 37 collectively form a ring structure 39 disposed between the stator shell 22 and a ring 25, which in the embodiment illustrated forms part of each of the end plates 13A, 13B.

Generally, a fluid cooling arrangement for the stator assembly 14 includes one or more first end channels 36A (FIG. 1A) provided on a first end of the stator assembly 14 fluidly connected to longitudinally extending cooling channels 38 (schematically illustrated in FIG. 1B) that in turn are connected to one or more second end channels 36B (FIG. 1A) on a second end of the stator assembly. A source of fluid 41 (FIG. 1) is connected to each of end channels 36A, 36B to form a closed system that circulates cooling fluid therethrough to absorb heat generated by the stator 14 and also heat from the rotor 18 due to the close proximity of the longitudinal cooling channels 38 to the outer surface of the rotor 18.

Figure 1E:
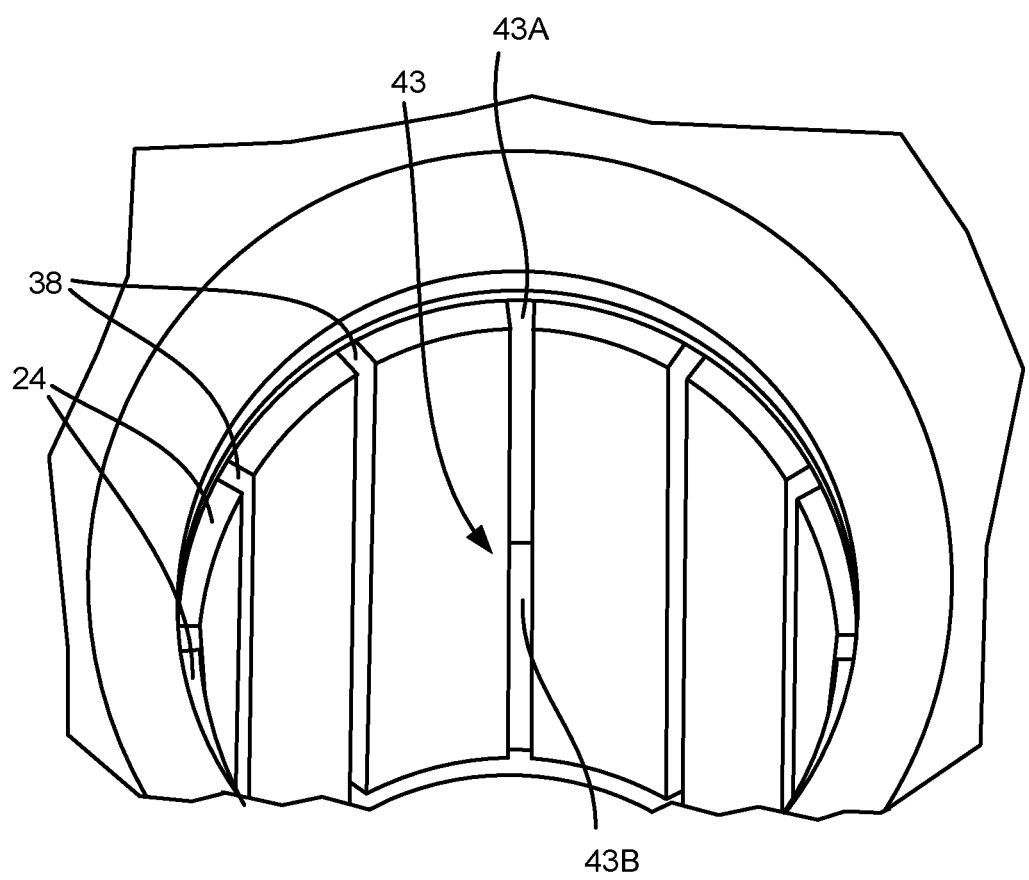
FIG. 1E is a perspective view of a portion of a stator assembly of the electric machine with portions removed.

Referring to FIG. 1B, each of the cooling channels 38 is formed in resin between remote ends of successive longitudinally extending teeth 24 closest to the rotor 18. Each cooling channel 38 comprises an inner surface 38A formed from a cylindrical sleeve or tube 40 and an inner surface 38B (portion not defined by sleeve 40) created in the resin by removable elongated members, one of which is illustrated in FIG. 1E at 43, and in the embodiment illustrated comprises two portions 43A and 43B that are present in the stator assembly 14 during impregnation. Each of the cooling channels 38 when formed is substantially parallel to the longitudinal axis 15. Sleeve 40 is coaxial with the longitudinal axis 15 and is of size so as to be slightly spaced apart from an outer surface 18A of the rotor 18. The shape of inner surface 38B is defined by the cross-sectional shape of the teeth 24 of the stator, but is configured so as to allow sufficient cooling fluid to flow preferably between and at the innermost remote ends of each successive pair of teeth 24.

Referring to FIGS. 2-5, at each end, each of the longitudinally extending cooling channels 38 is fluidly coupled to at least one end channel 36A, 36B. In the embodiment illustrated each end channel 36A, 36B comprises a first portion 44A proximate to and fluidly connected to an end of at least one cooling channel 38 and a second portion 44B extending radially outwardly from each corresponding first portion 44A. Each first portion 44A is formed in the resin of the conductors forming each end turn 37, while each corresponding second portion 44B also extends radially and comprises a bore formed in stator shell 22. In one embodiment, removable members or plugs (one of which is illustrated at 35 in FIG. 4 encircled in part by conductors 37A) can be temporarily disposed in each of the second portions 44B so as to extend radially toward axis 15 during resin impregnation to form each of the radially extending first portions 44A.

Stated another way, a first portion 44A is associated with some if not all of the poles of the stator assembly 14 at each end. Each portion 44A is longitudinally spaced apart from the end most radial tooth 24 and extends radially within portions of the conductors 37A forming loops of the end turns 37 associated with each corresponding tooth 24. In prior art machines such space would be empty devoid of resin, or resin filled. With the first portions 44A extending radially within this space the overall size of the machine 10 is not lengthened since this space was not otherwise used.

Each of the second portions 44B open to an annular space 50 formed between stator shell 22 and an inner surface of the housing 12. A first cooling port 52A in the housing 12 is fluidly connected to end channels 36A, while a second port 52B in the housing 12 is fluidly connected to end channels 36B.

Figure 6:
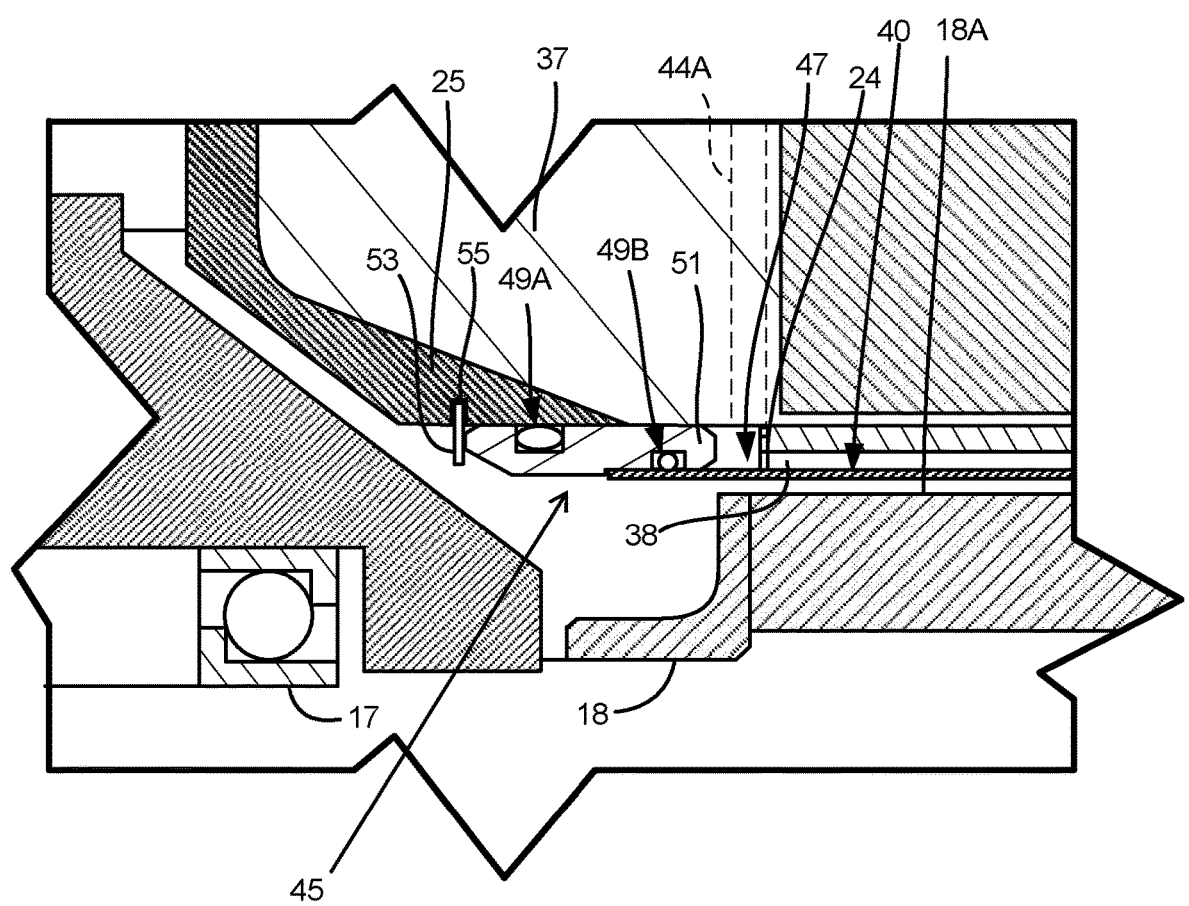
FIG. 6 is an enlarged view of a portion of FIG. 1C.

Referring to FIG. 6, although each of the first portions 44A can be fluidly connected to a single or multiple longitudinal channels 38, in a preferred embodiment, each of the end channels 36A, 36B (first portions 44A thereof) and each of the longitudinal channels 38 opens to an annular space 47 provided on each end of the stator assembly 14. A suitable sealing device 45 defines a portion of each annular space 47. In the embodiment illustrated, the sealing device 45 comprises a ring support 51 having a first o-ring 49A engaging ring portion 25 of each of the end plates 13A, 13B and a second o-ring 49B engaging the sleeve 40. A locking ring 53 which is secured within groove 55 of ring portion 25 holds the sealing device 45 in position, inhibiting axial movement outward away from ends of teeth 24, particularly when the cooling fluid is pressurized.

Figure 7:
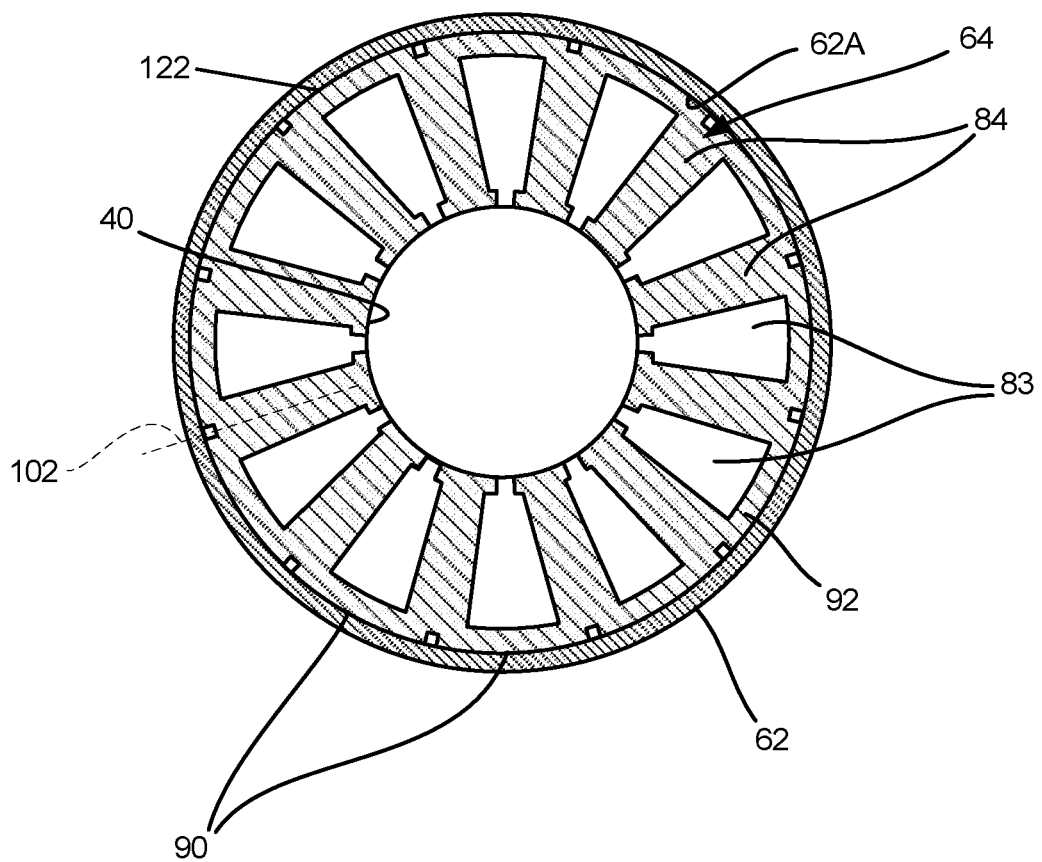
FIG. 7 is an end view of another electric machine with parts removed.
Figure 8:
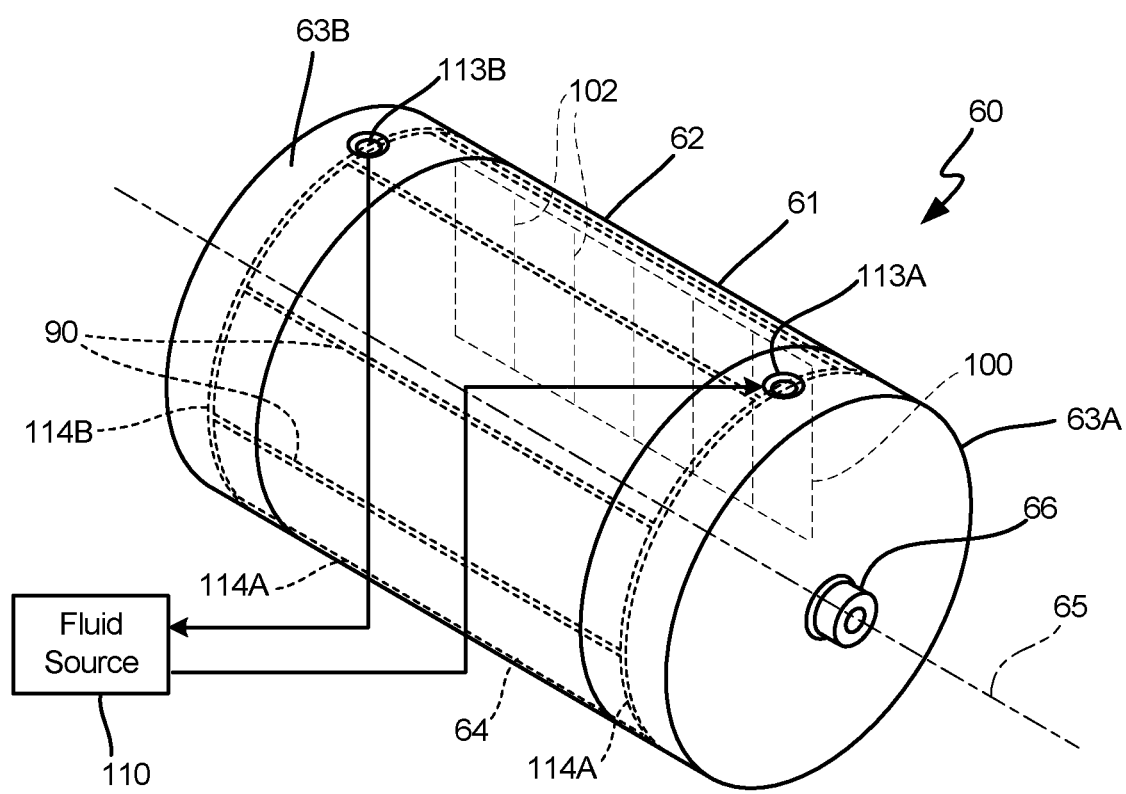
FIG. 8 is a perspective view of the electric machine of FIG. 7.

FIGS. 7 and 8 illustrates an electric machine 60 including a housing 62, a stator assembly 64, a shaft 66 of a rotor (not shown). The housing 62 includes a tubular center section 61 with end plates 63A and 63B. The stator assembly 64 is substantially annular and is secured within or to the housing 62 to remain stationary relative to the housing 62 during operation of the machine 60. The rotor is fixed to the shaft 66 for unitary rotation therewith about a longitudinal axis 65 and is generally circumscribed by the stator assembly 64. The rotor and shaft 66 are rotatable relative to the housing 62 and the stator assembly 64 being supported by one or more bearing assemblies (not shown) on end plates 63A and 63B.

The stator assembly 64 includes a plurality of stator teeth 84 extending in a radially inward direction toward the axis 65. One or more conductors (not shown) are disposed in slots 83 between each of the stator teeth 84 and conductors are wound or wrapped around each of the stator teeth 84 to form a stator coil or winding. The stator teeth extend longitudinally parallel to the axis 65 and are commonly formed by individual laminations held together with resin.

The stator assembly 64 includes circumferentially spaced apart cooling channels 90, each cooling channel extending parallel to the longitudinal axis 65. In a preferred embodiment, the number of cooling channels 90 equals the number of teeth 84. In particular each cooling channel 90 is disposed at an outer periphery 92 of the stator assembly 64 where the magnetic flux density developed in the electric machine 60 during operation is low if not the lowest due to placement of the conductors in the slots 83 and the symmetry of each tooth 84. Stated another way, each tooth 84 has an associated centerplane 100 extending radially outwardly from axis 65, the centerplane 100 being in the middle of each tooth 84 due to symmetry of each tooth 84 in a direction of the axis 65. When the teeth 84 of the stator assembly 64 are formed of stacked laminations, a plurality of centerlines 102 is present on each lamination, each centerline 102 of each tooth 84 for each lamination being in the centerplane for that tooth 84 extending in the axial direction of rotor axis 65 (shown schematically in FIG. 8). A portion of each cooling channel 90 is provided on each centerline 102 at the outer periphery 92 of each lamination, the cooling channels 90 being formed by the aligned portions along the length of the stacked laminations.

In the embodiment illustrated, each of the cooling channels 90 comprises an outwardly opening channel facing and bounded in part by portions of an inwardly facing surface 62A of the housing 62. A particular benefit of the location of the cooling channels 90 along the outer periphery 92 of the stator assembly 64 adjacent the inner surface 62A of the housing 62 is that the power density of the electric machine 60 is increased due to the elimination of a cooling sleeve having a cooling channel that is separate from the material forming the teeth of the stator winding found in electric machines of the prior art. In other words for a given diameter constraint for an electric machine, the electric machine 60 of the present design would have a larger stator assembly 64 than a prior art design that employs a sleeve in addition to the outer housing.

Also due to location of each of the cooling channels 90 at portions of the stator assembly 14 where the magnetic flux density is lowest, any reduction in performance of the electric machine 60 is minimized if not affected at all. In other words, since the magnetic flux is not present or is very low at the particular portions of the stator assembly 64 whereat the cooling channels 90 are present elimination of this material of the stator assembly 64 does not affect or significantly affect magnetic flux in the stator assembly 64 during operation of the electric machine 60.

Referring to FIG. 8, each end of the cooling channels 90 (schematically illustrated as dashed lines) are fluidly coupled to a source of cooling fluid 110 through ports 113A and 113B. In one embodiment, ends of the cooling channels 90 on each end of the electric machine 10 open to a common annular passageway 114A and 114B (shown schematically using dashed lines). The annular passageways 114A, 114B can be provided at ends of the center portion 61 and/or with end plates 63A, 63B. For instance, the annular passageways 114A, 114B can be provided with suitable sealing devices such as o-rings between ends of the center portion 61 and each of the end plates 63A, 63B. However, this construction is but one exemplary embodiment and should not be considered a necessary feature. Ports 113A, 113B are fluidly connected to annular passageways 114A, 114B.

Cooling channels 120, similar to cooling channels 90 and formed the same way in the laminations, can also be provided in the electric machine 10 if desired as illustrated in FIG. 2. In this embodiment, each cooling channel 120 is formed on an outer surface 122 of the stator assembly 64 opening toward and bounded by portions of an inner surface 22A of sleeve 22.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An electric machine comprising:
   a housing;
   a rotor rotatably supported by the housing for rotation about a longitudinal axis; and
   a stator assembly fixedly secured to the housing spaced apart from a surface of the rotor and concentric with the rotor about the longitudinal axis, the stator assembly having a stator winding comprising circumferentially spaced apart stator teeth about the longitudinal axis, the stator teeth having remote ends proximate the surface of the rotor, wherein a plurality of longitudinal cooling channels extend parallel to the longitudinal axis are disposed between remote ends of successive teeth, and wherein each end of each longitudinal cooling channel is fluidly connected to radially extending channels formed in the stator assembly, the longitudinal sealed cooling channels being formed in resin of the stator assembly, the longitudinal sealed cooling channels and radially extending channels being fluidly connected to ports in a closed system and configured to circulate cooling fluid axially in the longitudinal cooling channels and radially in the radial extending channels to cool the stator assembly and remove heat from the stator assembly proximate the surface of the rotor.

2. The electric machine of claim 1 wherein the radially extending channels are disposed at each end of the stator assembly.

3. The electric machine of claim 2 wherein each of the longitudinal cooling channels and ends of the radially extending channels open to an annular space about the longitudinal axis at each end of the stator assembly.

4. The electric machine of claim 3 wherein at least a portion of each of the radially extending channels are formed in resin of the stator assembly.

5. The electric machine of claim 4 wherein at least some of the radially extending channels are bounded in part by conductors of end turns of the stator assembly.

6. The electric machine of claim 3 wherein each annular space is defined in part by an annular sealing device.

7. The electric machine of claim 6 wherein the stator assembly includes an inner sleeve concentrically disposed about the longitudinal axis radially inward from remote ends of the stator teeth.

8. The electric machine of claim 7 wherein portions of an inner surface of the inner sleeve define a portion of each longitudinal cooling channel.

9. The electric machine of claim 8 wherein the annular sealing device comprises a ring and a first o-ring sealing engaging the ring and a portion of the housing and a second o-ring sealing engaging the ring and a portion of the inner sleeve.

10. An electric machine comprising:
    a housing;
    a rotor rotatably supported by the housing for rotation about a longitudinal axis; and
    a stator assembly fixedly secured to the housing spaced apart from a surface of the rotor and concentric with the rotor about the longitudinal axis, the stator assembly having a stator winding comprising circumferentially spaced apart stator teeth about the longitudinal axis, wherein radially extending channels are disposed at each end of the stator assembly, wherein at least a portion of each of the radially extending channels are formed in resin of the stator assembly and wherein at least some of the radial extending channels are bounded in part by conductors of end turns of the stator assembly, the radially extending channels being fluidly connected to ports and configured to direct cooling fluid radially with respect to the longitudinal axis in each radially extending channel.

11. The electric machine of claim 10 wherein ends of the radially extending channels open to an annular space about the longitudinal axis at each end of the stator assembly.

12. The electric machine of claim 11 wherein each annular space is defined in part by an annular sealing device.

13. The electric machine of claim 12 wherein the stator assembly includes an inner sleeve concentrically disposed about the longitudinal axis radially inward from remote ends of the stator teeth.

14. The electric machine of claim 13 wherein portions of an inner surface of the inner sleeve define a portion of cooling channels extending parallel to the longitudinal axis.

15. The electric machine of claim 14 wherein the annular sealing device comprises a ring and a first o-ring sealing engaging the ring and a portion of the housing and a second o-ring sealing engaging the ring and a portion of the inner sleeve.

16. The electric machine of claim 10 wherein the stator teeth have remote ends proximate the surface of the rotor, each tooth having a centerplane across a width extending radially, wherein a plurality of cooling channels extend parallel to the longitudinal axis are arranged on an outer periphery of the stator assembly such that a cooling channel is located on each centerplane, each cooling channel sealed by an inner surface of the housing along a longitudinal length thereof.

17. The electric machine of claim 16 wherein each of the cooling channels is open to the inner surface of the housing along each longitudinal length.

18. The electric machine of claim 16 wherein the stator teeth are comprised of laminations, each lamination having a plurality of notches, wherein each notch is aligned with a notch of an adjacent lamination to form each corresponding cooling channels.

19. The electric machine of claim 16 wherein each of the cooling channels opens to a common annular passageway on each end of the stator assembly.

20. The electric machine of claim 19 wherein each common annular passageway is fluidly coupled to the ports, wherein a first port receives fluid into its associated common annular passageway and a second port receives fluid from its associated common annular passageway.

21. The electric machine of claim 1 wherein at least a portion of each of the radially extending channels are formed in resin of the stator assembly and wherein at least some of the radial extending channels are bounded in part by conductors of end turns of the stator assembly.

22. The electric machine of claim 16 wherein a plurality of sealed rotor cooling channels extend parallel to the longitudinal axis and are disposed between remote ends of successive teeth, the rotor cooling channels being formed in resin of the stator assembly, the rotor cooling channels being fluidly connected to ports in a closed system to circulate cooling fluid to cool the stator assembly and configured to remove heat from the stator assembly proximate the surface of the rotor.

23. The electric machine of claim 10 wherein the stator teeth have remote ends proximate the surface of the rotor, each tooth having a portion of lowest flux density during operation at an outer periphery opposite an inner surface of the housing, and wherein a plurality of cooling channels extend parallel to the longitudinal axis are arranged on the outer periphery of the stator assembly such that a cooling channel is located at each of the portions of lowest flux density for each of the stator teeth.

* * * * *